3,324,070
VINYL RESINS PLASTICIZED WITH POLYCARBONATE POLYMERS

Fritz Hostettler and Eugene F. Cox, both of Charleston, W. Va., assignors to Union Carbide Corporation, a corporation of New York
No Drawing. Filed May 28, 1964, Ser. No. 371,074
11 Claims. (Cl. 260—32.2)

This invention relates to the preparation of plasticized compositions.

A major shortcoming of externally-plasticized, flexible resin compositions. e.g., poly(vinyl halide), is the tendency of the plasticizer to escape from the plasticized composition by volatilization or by extraction processes. These tendencies become aggravated or more pronounced at elevated temperatures such as in fields of applications in which the plasticized composition is used, for example, as an insulating medium for wire and cable. Contact with various liquid media, e.g., water, oil, fats, etc., also can result in the extraction or loss of the plasticizer in the plasticized composition. Loss of the plasticizer eventually can cause undesirable stiffening of the plasticized composition which ultimately leads to failure by cracking, excessive stiffening, shrinkage, and the like.

The instant invention encompasses the preparation of novel plasticized resins, in particular, the preparation of plasticized vinyl resins, using various polycarbonate polymers described hereinafter as the plasticizing agents therefor. In general, the aforesaid polycarbonates exhibit a combination of highly desirable properties. Many of the novel plasticized compositions exhibit outstanding low temperature performance, and an unexpectedly high degree of permanence. Excellent flexibility at temperatures below 0° C., and extraordinary brittle temperatures far below 0° C. also are characteristics of the novel plasticized compositions. In addition, these novel plasticized compositions exhibit low volatility, high resistance to oil and/or water extraction, excellent color and processability, and superior resistance to staining. They are oftentimes available as easily-pourable liquids, and are therefore susceptible to facile handling and mixing as comparable with the highly viscous, non-pourable plasticizers. Many of the plasticizers are non-toxic and impart light stability to the novel plasticized compositions.

The plasticizers which are contemplated are prepared by the polymerization reaction of an admixture containing a cyclic carbonate and an initiator in the presence or absence of a catalyst to form polycarbonates of widely varying and readily controllable molecular weights. The polymerization is initiated by reaction with one or more compounds having at least one reactive hydrogen capable, with or without the aid of a catalyst, of opening the cyclic carbonate ring and adding it as an open chain to said compound(s) without forming water of condensation. Compounds that are suitable for initiating the polymerization, and therefore referred to herein as initiators, include monofunctional initiators such as alcohols, amines, and monocarboxylic acids, and polyfunctional initiators such as polyols, polyamines, amino alcohols, and vinyl polymers, as well as amides, sulfonamides, hydrazones, semi-carbazones, oximes, polycarboxylic acids, hydroxy carboxylic acids and aminocarboxylic acids.

The cyclic carbonate(s) used as starting material in the aforesaid polymerization reaction are those which are free from ethylenic and acetylenic unsaturation. The cyclic carbonates are characterized in that they contain at least 6 atoms (and upwards to 21 atoms), preferably 6 atoms, in the ring nucleus which possesses the carbonate group, i.e.

and especially, those in which the ring nucleus is composed of carbon and oxygen, said oxygen being present in the form of the carbonate group

Etheric oxygen can also be present in said nucleus. The cyclic carbonate monomers are further characterized in that they contain no more than four substituents or groups bonded to the carbon atoms of the ring nucleus which contains the carbonate group. In a preferred aspect, these cyclic carbonate monomers are characterized in that (a) they possess the 1,3-dioxane-2-one nucleus, (b) they contain no more than 3 substituents bonded to the carbon atoms of said nucleus, and (c) both ring carbon atoms which are alpha to the oxygen atoms of the carbonate group contain no more than one substituent on each of said carbon atoms. The cyclic carbonate monomers which are composed of (1) carbon, hydrogen, and oxygen atoms, or (2) carbon, hydrogen, oxygen, and nitrogen atoms, said nitrogen atom being in the form of nitro, cyanoalkoxymethyl, or cyanoalkyl (—RCN) groups represent further preferred classes. In this respect, the oxygen is always present in the form of the carbonate group

and etheric oxygen (—O—), esteric oxygen

and/or nitro oxygen (—NO₂) may also be present in the carbonate molecule.

Among the exemplary cyclic carbonate compounds are those depicted by the following formula:

(I)
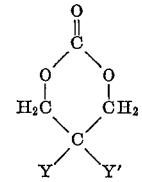

wherein Y and Y' are monovalent groups which are free of ethylenic and acetylenic unsaturation. To further illustrate these monovalent groups, Y can be hydrocarbyl, e.g., alkyl, aralkyl, and the like; hydrocarbyloxymethyl, e.g., alkoxymethyl, aralkoxymethyl, and the like; acyloxymethyl, e.g., alkanoyloxymethyl, and the like; and nitro (—NO₂); Y' can be hydrocarbyl, e.g., alkyl, aralkyl, and the like; hydrocarbyloxymethyl, e.g., alkoxymethyl, aralkoxymethyl, and the like; and acyloxymethyl, e.g., alkanoyloxymethyl, and the like.

With reference to Formula I above, illustrative Y and Y' radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the alkoxymethyls, preferably the lower alkoxymethyls, e.g., methoxymethyl, ethoxymethyl, propoxymethyl, n-butoxymethyl, t-butoxymethyl, isobutoxymethyl, 2-ethylhexoxymethyl, decoxymethyl, and the like; the acyloxymethyls, e.g., ethanoyloxymethyl, propanoyloxymethyl, butanoyloxymethyl, hexanoyloxymethyl, octanoyloxymethyl, and the like.

It is pointed out at this time that the terms a "lower alkyl" radical or a "lower alkoxy" radical as used herein, includes those radicals which contain from 1 to 6 carbon atoms therein. It is further preferred that the Y and Y' radicals, individually, contain no more than 12 carbon atoms each.

Exemplary classes of cyclic carbonate compounds include 4-nitro-4-alkanoyloxymethyl-2,6-dioxacyclohexanone,
4-nitro-4-alkoxymethyl-2,6-dioxacyclohexanone,
4-nitro-4-alkyl-2,6-dioxacyclohexanone,
4-alkyl-4-alkoxymethyl-2,6-dioxacyclohexanone,
4,4-dialkyl-2,6-dioxacyclohexanone,
4,4-di(alkoxymethyl)-2,6-dioxacyclohexanone,
4,4-di(alkanoyloxymethyl)-2,6-dioxacyclohexanone, and the like.

Specific examples of the cyclic carbonate compounds include, for instance, 4-nitro-4-methoxymethyl-2,6-dioxacyclohexanone,
4-nitro-4-propoxymethyl-2,6-dioxacyclohexanone,
4-nitro-4-butoxymethyl-2,6-dioxacyclohexanone,
4-nitro-4-propyl-2,6-dioxacyclohexanone,
4-nitro-4-n-butyl-2,6-dioxacyclohexanone,
4-nitro-4-propanoyloxymethyl-2,6-dioxacyclohexanone,
4-nitro-4-butanoyloxymethyl-2,6-dioxacyclohexanone,
4-methyl-4-ethyl-2,6-dioxacyclohexanone,
4,4-diethyl-2,6-dioxacyclohexanone,
4-isopropyl-4-ethyl-2,6-dioxacyclohexanone,
4-methyl-4-ethoxymethyl-2,6-dioxacyclohexanone,
4-methyl-4-propoxymethyl-2,6-dioxacyclohexanone,
4-ethyl-4-propoxymethyl-2,6-dioxacyclohexanone,
4-ethyl-4-butoxymethyl-2,6-dioxacyclohexanone,
4,4-dimethyl-2,6-dioxacyclohexanone,
4,4-di-n-butyl-2,6-dioxacyclohexanone,
4,4-di(propoxymethyl)-2,6-dioxacyclohexanone,
4,4-di(butoxymethyl)-2,6-dioxacyclohexanone,
4,4-di(propanoyloxymethyl)-2,6-dioxacyclohexanone, and the like.

Further illustrative cyclic carbonates which are contemplated in the aforementioned polymerization reaction include, for instance, the mono-, di- and/or trihydrocarbyl substituted 2,6-dioxacyclohexanones such as 3- and/or 4- and/or 5- alkyl-2,6-dioxacyclohexanones and the 3- and/or 4- and/or 5- aralkyl-2,6-dioxacyclohexanone, e.g., 3- and/or 4-methyl-2,6-dioxacyclohexanone, 3- and/or 4-ethyl-2,6-dioxacyclohexanone, 3- and/or 4-propyl-2,6-dioxacyclohexanone, 3- and/or 4-isopropyl-2,6-dioxacyclohexanone, 3- and/or 4-n-butyl-2,6-dioxacyclohexanone, 3- and/or 4-isobutyl-2,6-dioxacyclohexanone, 3- and/or 4-t-butyl-2,6-dioxacyclohexanone, and the like; the 2,4,5-tri(lower alkyl)-2,6-dioxacyclohexanone, e.g., 3,4,5-trimethyl-2,6-dioxacyclohexanone, 3,4,5-triethyl-2,6-dioxacyclohexanone, and the like; the polymethylene carbonates which have at least 6 atoms in the ring nucleus which contains the carbonate group, e.g., trimethylene carbonate, decamethylene carbonate, undecamethylene carbonate, dodecamethylene carbonate, tri-decamethylene carbonate, octadecamethylene carbonate, and the like; the polyoxyalkylene carbonates, e.g., triethylene glycol carbonate, tetraethylene glycol carbonate, and the like; the 4,4-di(halomethyl)-2,6-dioxacyclohexanone, such as the 4,4-di(chloromethyl)-2,6-dioxacyclohexanone, etc.; 4,4-di(cyanomethyl)-2,6-dioxacyclohexanone; 3-chloromethyl-2,6-dioxacyclohexanone; and 3-cyanomethyl-2,6-dioxacyclohexanone.

Alcohols that are useful as monofunctional initiators include, for instance, monohydric alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8 - trimethyl - 4-nonanol, 5-ethyl-2-nonanol, 7-ethyl-2-methyl-4-undecanol, 3,9-triethyl-6-decanol, lauryl alcohol, benzyl alcohol, phenyl methyl carbinol, cyclohexanol, cyclopentanol, cycloheptanol, and trimethylcyclohexanol.

Further alcohols contemplated include the monoesterified diols such as those prepared by the reaction of equimolar amounts of an organic monocarboxylic acid, ester, or acyl halide, with a diol such as alkylene glycols, poly(alkylene glycols), mono- and polyether diols, mono- and polyester diols, etc., e.g.,

wherein

is acyl and R' is a divalent radical containing at least two carbon atoms in the divalent chain; the monoetherified diols such as those represented by the formula $R_1OR'OH$ wherein $R_1$ represents a hydrocarbyl radical and R' has the aforesaid value; the mono-ols produced by the partial esterification reaction of a polyol containing at least three hydroxyl groups, e.g., glycerine, with a molar deficiency of an organic carboxylic acid, ester, or acyl halide; and the like. The aforesaid reactions are well documented in the literature.

Illustrative amines that are useful as monofunctional initiators include primary and secondary aliphatic amines such as the methyl-, ethyl-, n-propyl-, isopropyl-, n-butyl-, sec-butyl-, isobutyl-, tert-butyl-, n-amyl-, n-hexyl- and 2-ethylhexylamines, as well as the corresponding dialkylamines; the aromatic amines such as aniline, ortho-toluidine, meta-toluidine, and the like; the cycloaliphatic amines such as cyclohexylamine, dicyclohexylamine, and the like; and heterocyclic amines such as pyrrolidine, piperidine, morpholine, and the like.

Illustrative of the monocarboxylic acids include propionic acid, butyric acid, valeric acid, dodecanoic acid, acrylic acid, cyclohexanecarboxylic acid, and the like.

Among the polyols which are suitable as polyfunctional initiators include the diols of the formula $HO(CH_2)_nOH$ wherein $n$ is a number from 2 to 40, and more, and the mono- and polyether polyols as exemplified by the formula

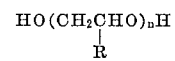

wherein R is hydrogen or alkyl, e.g., methyl, and $n$ is a number from 1 to 40, and more, such as ethylene glycol, propylene glycol, butylene glycol, diethylene glycol, dipropylene glycol, and the like; 2,2-dimethyl-1,3-propanediol; 2 - butene-1,4-diol; 2,2-diethyl-1,3-propanediol; 3-methyl-1,5-pentanediol; the N-methyl- and N-ethyldiethanolamines; the various cyclohexanediols; 4,4'-methylenebiscyclohexanol; 4,4' - isopropylidenebiscyclohexanol; the ortho-, meta-, and para-xylene glycols; the hydroxymethyl substituted phenethyl alcohols; the ortho-, meta-, and para-hydroxymethyl phenylpropanols; the various phenylenediethanols; the various phenylenedipropanols; the various heterocyclic diols such as 1,4-piperazinediethanol; and the like. Polyester polyols prepared by the reaction of a dicarboxylic acid, its diester, or dihalide with a molar excess of a diol are likewise suitable, e.g., the reaction of one mol of adipic acid with 2 mols of ethylene glycol.

Other suitable hydroxyl-containing initiators include polyoxyalkylated derivatives of mono- and polyfunctional compounds having at least one reactive hydrogen atom. These functional compounds may contain primary or secondary hydroxyls, phenolic hydroxyls, primary or secondary amino groups, amido, hydrazino, guanido, ureido, mercapto, sulfino, sulfonamide, or carboxyl groups. They are obtained by reacting, for example, monohydric compounds such as aliphatic and cycloaliphatic alcohols, e.g., alkanol, alkenol, methanol, ethanol, allyl alcohol, 3-buten-1-ol, 2-ethylhexanol, etc.; diols of the class HO$(R)_n$OH and HO$(RORO)_n$H wherein R is alkylene of 2 to 4 carbon atoms and wherein $n$ equals 1 to 10 such as ethylene glycol, propylene glycol, diethylene glycol, dipropylene glycol, and the like; thiodiethanol; the xylenediols, 4,4'-methylenediphenol, 4,4'-isopropylidenediphenol, resorcinol, and the like; the mercapto alcohols such as mercaptoethanol; the dibasic acids such as maleic, succinic, glutaric, adipic, pimelic, sebacic, phthalic, tetrahydrophthalic, and hexahydrophthalic acids; phosphorous acid; the aliphatic, aromatic, and cycloaliphatic primary monoamines, like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with vicinal monoepoxides as exemplified by ethylene oxide, 1,2-epoxypropane, 1,2-epoxybutane, 2,3-epoxybutane, isobutylene oxide, butadiene monoxide, allyl glycidyl ether, 1,2-epoxyoctene-7, styrene oxide, and mixtures thereof.

The preparation of the above exemplified polyoxyalkylated derivatives suitable for the preparation of the plasticizers is illustrated by the reaction of 1,4-butanediol with ethylene oxide;

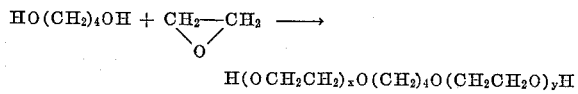

H(OCH$_2$CH$_2$)$_x$O(CH$_2$)$_4$O(CH$_2$CH$_2$O)$_y$H wherein $x+y$ equals, for example, one to forty.

Other useful bifunctional initiators are polymers of monoepoxides obtainable by polymerizing with such catalysts as oxonium salts of hydrogen halides; metal or nonmetal halides whose etherates are oxonium complexes; electrophilic metal or non-metal halides in the presence of hydrogen halides, acyl halides; or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction. Among suitable monoepoxides for preparing such polymers are tetrahydrofuran, trimethylene oxide, propylene oxide, ethylene oxide, and mixtures thereof.

Higher functional alcohols suitable for initiating the polymerization of cyclic carbonates include the triols such as glycerol, 1,1,1-trimethylolpropane, 1,2,4-butanetriol, 1,2,6-hexanetriol, triethanolamine, triisopropanolamine, and the like; the tetrols such as erythritol, pentaerythritol, N,N,N',N' - tetrakis(2-hydroxyethyl)ethylenediamine, N,N,N',N' - tetrakis(2-hydroxypropyl)ethylenediamine, and the like; the pentols; the hexols such as dipentaerythritol, sorbitol, and the like; the alkyl glycosides; the carbohydrates such as glucose, sucrose, starch, cellulose, and the like.

Also suitable as polyols are the polyoxyalkylated derivatives of polyfunctional compounds having three or more reactive hydrogen atoms as, for example, the reaction product of 1,1,1-trimethylolpropane with ethylene oxide in accordance with the reaction:

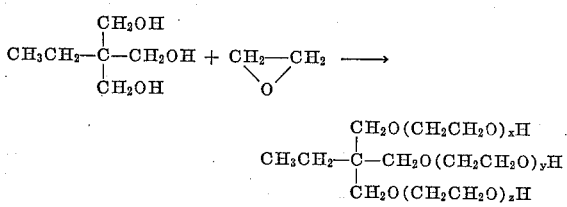

wherein $x+y+z$ equals 3 to 45, and more.

In addition to the polyoxyalkylated derivatives of trimethylolpropane, the following illustrative compounds are likewise suitable: glycerol; 1,2,4-butanetriol; 1,2,6-hexanetriol; erythritol; pentaerythritol; sorbitol; the methyl glycosides; glucose; sucrose; the diamines of the general formula H$_2$N(CH$_2$)$_n$NH$_2$, where $n$ equals 2 to 12; 2-(methylamino)ethylamine; the various phenylene- and toluenediamines; benzidine; 3,3'-dimethyl-4,4'-biphenyldiamine; 4,4' - methylenedianiline; 4,4',4'' - methylidynetrianiline, the cycloaliphatic diamines such as 2,4-cyclohexanediamine, 1-methyl - 2,4 - cyclohexanediamine, and the like; the amino alcohols of the general formula HO(CH$_2$)$_n$NH$_2$ where $n$ equals 2 to 10; the polyalkylene polyamines such as diethylenetriamine, triethylenetetramine, tetraethylenepentamine, and the like; the polycarboxylic acids such as citric acid, aconitic acid, mellitic acid, pyromellitic acid, and the like; and polyfunctional inorganic acid lke phosphoric acid.

Difunctional amino alcohols capable of initiating the polymerization of cyclic carbonates include, for example, the alcohols of the general formula HO(CH$_2$)$_n$NH$_2$, where $n$ equals 2 to 10; other hydroxyalkylamines such as N-methylethanolamine, isopropanolamine, N - methylisopropanolamine, and the like; the aromatic amino alcohols like para-amino-phenethyl alcohol, para - amino - alpha-methylbenzyl alcohol, and the like; the various cycloaliphatic amino alcohols such as 4-aminocyclohexanol, and the like.

Higher functional amino alcohols having a total of at least three hydroxy and primary or secondary amino groups that are suitable include the dihydroxyalkylamines, e.g., diethanolamine, diisopropanolamine, and the like; 2-(2-aminoethylamino)ethanol; 2-amino-2 - (hydroxymethyl)-1,3-propanediol; and the like.

Suitable diamines includes aliphatic diamines of the general formula H$_2$N(CH$_2$)$_n$NH$_2$, monosecondary diamines of the general formula R''NH(CH$_2$)$_n$NH$_2$, and disecondary diamines of the general formula (R''NH(CH$_2$)$_n$NHR'' where $n$ equals 2 to 10, and more, and where R'' is alkyl, aryl, aralkyl or cycloalkyl; the aromatic diamines such as meta-phenylenediamine,
para-phenylenediamine,
toluene-2,4-diamine,
toluene-2,6-diamine,
1,5-naphthalenediamine,
1,8-naphthalenediamine,
meta-xylylenediamine,
para-xylylenediamine,
benzidine,
3,3'-dimethyl-4,4'-biphenyldiamine,
3,3'-dimethoxy-4,4'-biphenyldiamine,
3,3'-dichloro-4,4'-biphenyldiamine,
4,4'-methylenedianiline,
4,4'-ethylenedianiline,
2,3,5,6-tetramethyl-para-phenylenediamine,
2,5-fluorenediamine, and
2,7-fluorenediamine;

the cycloaliphatic diamines such as 1,4-cyclohexanediamine,
4,4'-methylenebiscyclohexylamine, and
4,4'-isopropylidinebiscyclohexylamine;

and the heterocyclic amines such as piperazine, 2,5-dimethylpiperazine, 1,4-bis(3-aminopropyl)piperazine, and the like.

Illustrative of the higher functional polyamines which can be employed as initiators include, for example, higher polyalkylene polyamines such as diethylenetriamine, triethylenetetramine, tetraethylenepentamine, dipropylenetriamine, tripropylenetetramine, tetrapropylenepentamine, and the like; 1,2,5-benzenetriamine, toluene-1,2,4,6-triamine; 4,4',4''-methylidynetrianiline, and the like; the polyamines obtained by interaction of aromatic monoamines with formaldehyde or other aldehydes, for example:

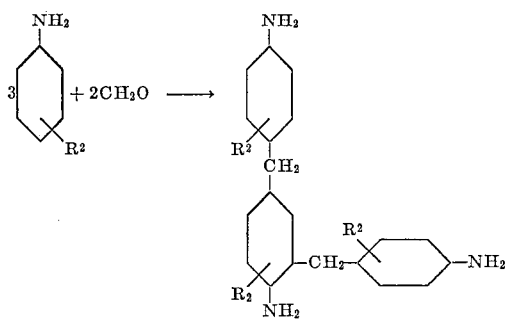

and other reaction products of the above general type, where $R^2$ is H or alkyl.

The cyclic carbonate will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula

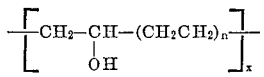

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene, 3-butene-1,2-diol, allyl alcohol, methallyl alcohol, 3-phenyl-3-butene-1-ol, and vinyl ethers like diethylene glycol monovinyl ether $CH_2=CH-OCH_2CH_2OCH_2CH_2OH$.

Representatives of the many polycarboxylic acids that are suitable as polyfunctional initiators are the aliphatic, cycloaliphatic, and aromatic dicarboxylic acids such as oxalic acid, succinic acid, maleic acid, glutaric acid, adipic acid, pimelic acid, suberic acid, azelaic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, 4,4'-(ethylenedioxy)-dibenzoic acid, 4,4'-biphenyldicarboxylic acid, 4,4'-sulfonyldibenzoic acid, 4,4'-oxydibenzoic acid, the various tetrahydrophthalic acids, the various hexahydrophthalic acids, as well as higher functional acids such as tricarballylic acid, aconitric acid, citric acid, hemimellitic acid, trimellitic acid, trimesic acid, pyromellitic acid, 1,2,3,4-butanetetracarboxylic acid, and the like. Polycarboxy polyesters produced by the reaction of a sufficient molar excess of a polycarboxylic acid, e.g., adipic acid, with a polyol, e.g., diethylene glycol, are also suitable.

Suitable hydroxy- and aminocarboxylic acids include 2-hydroxypropionic acid, 6-hydroxycaproic acid, 11-hydroxyundecanoic acid, salicylic acid, para-hydroxybenzoic acid, beta-alanine, 6-aminocaproic acid, 7-aminoheptanoic acid, 11-aminoundecanoic acid, and para-aminobenzoic acid.

In brief, therefore, the compounds which are extremely useful in initiating the polymerization reaction included the mono- and polycarboxy-containing initiators, the mono- and polyhydroxy-containing initiators, and/or the mono- and polyamino-containing initiators.

In an extremely preferred aspect, the plasticizers which are contemplated in the novel plasticized compositions are obtained via the polymerization of an admixture which contains at least one cyclic carbonate as illustrated supra, at least one initiator as illustrated supra, and at least one cyclic ester characterized by the following formula:

(II) 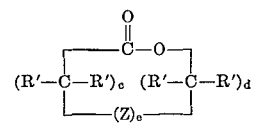

wherein each R', individually, can be hydrogen, alkyl, halo, haloalkyl, alkoxyalkyl, alkoxy, and the like; wherein Z can be an oxy (—O—) group or a divalent saturated aliphatic hydrocarbon group of the formula

wherein the R' variables have the same values as above; wherein $c$ is an integer of from 1 to 4, inclusive; wherein $d$ is an integer of from 1 to 4, inclusive; wherein $e$ is an integer having a value of zero or one; with the provisos that (a) the sum of $c+d+e$ cannot equal 3, (b) the total number of organic substituents (such as those described for the R' variables) attached to the carbon atoms contained in the cyclic ester ring does not exceed 4, preferably does not exceed 3, and (c) the omega carbon atom which is adjacent to the oxy (—O—) group has at least one hydrogen substituent attached to said omega carbon atom.

With reference to Formula II supra, illustrative R' radicals include, among others, methyl, ethyl, n-propyl, isopropyl, n-butyl, sec-butyl, t-butyl, amyl, the hexyls, chloromethyl, chloroethyl, bromopropyl, bromobutyl, chloro, bromo, iodo, methoxy-methyl, ethoxyethyl, propoxymethyl, butoxypropyl, methoxy, ethoxy, n-butoxy isopentoxy, n-hexoxy, 2-ethylhexoxy, and the like. It is preferred that each R', individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve.

Representative monomeric cyclic esters which can be employed in the polymerization reaction include, for example, beta - propiolactone; delta - valerolactone; epsilon-caprolactone; 7-hydroxyheptanoic acid lactone; 8 - hydroxyoctanoic acid lactone; the alpha, alpha-dialkyl-beta-propiolactones, e.g., alpha, alpha - dimethyl - beta-propiolactone, alpha, alpha - diethyl - beta - propiolactone, and the like; the monoalkyl - delta-velerolactones, e.g., the monomethyl-, monoethyl-, monoisopropyl-, monobutyl-, monohexyl-, monodecyl-, and monododecyl - delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl - dialkyl-, or trialkyl - epsilon - caprolactones, e.g., the monomethyl-, monoethyl-, monoisopropyl-, monohexyl-, mono-n-octyl-, dimethyl-, diethyl-, di-n-propyl, diisobutyl, di-n-hexyl-, trimethyl-, triethyl-, and tri-n-propyl-epsilon-caprolactones, and the like; the monoalkoxy- and dialkoxy - delta - valerolactones and epsilon - caprolactones, e.g., monomethoxy-, monoethoxy-, monoisopropoxy-, dimethoxy-, diethoxy-, and dibutoxy- delta-valerolactones and epsilon-caprolactones, and the like. Further illustrative cyclic esters include 3-ethyl-2-keto-1,4-dioxane, alpha, alpha-bis - (chloromethyl) - propiolactone, 1,4-dioxane-2-one, 3-n-propyl-2-ketone-1,4-dioxane, and the like.

The polymerization reaction can be carried out in the absence of a catalyst though it is preferred to effect the reaction in the presence of an ester exchange catalyst.

Among the catalysts suitable for this purpose are such metals as lithium, sodium, potassium, rubidium, caesium, magnesium, calcium, barium, strontium, zinc, titanium, cobalt, germanium, tin, lead, antimony, arsenic and cerium, as well as the alkoxides thereof. Additional suitable catalyst are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, and cobaltous acetate.

The organic titanium compounds that are especially suitable as catalysts because of their ability to promote the formation of virtually colorless polycarbonates in a short time are the titanates having the general formulae:

$$X_2TiO_3 \text{ and } X_4TiO_4$$

in which the Xs are alkyl, aryl, or aralkyl, radicals, the alkyl titanates in which the Xs are lower alkyl radicals, particularly methyl, ethyl, propyl, isopropyl, butyl, isobutyl, tertiary butyl, amyl, isoamyl, etc., radicals, being preferred. Titanates that deserve special mention because of their efficiency in accelerating the reaction and producing virtually colorless polycarbonates are tetraisopropyl titanate and tetrabutyl titanate.

Additional highly preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further preferred catalysts which are contemplated. The disclosures of the aforesaid patents are incorporated by reference into the specification.

Acidic catalysts which can be employed in the polymerization reaction include, for example, the Lewis acids, preferably the metal halide Lewis acids, e.g., boron trifluoride, aluminum chloride, zinc chloride, stannic chloride, ferric chloride, boron trifluoride-piperidine complex, boron trifluoride - 1,6 - hexanediamine complex, boron trifluoride - monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted - benzenesulfonic acid, and the like.

The catalysts are employed in catalytically significant quantities. For optimum results, the particular catalyst employed, the nature of the monomeric reactant(s) and initiator, the operative conditions under which the polymerization reaction is conducted, and other factors, will largely determine the desirable catalyst concentration. In general, a catalyst concentration in the range of from about 0.0001 and lower, to about 3, and higher, weight percent, based on the weight of total monomeric feed, is suitable. A catalyst concentration in the range of from about 0.001 to about one weight percent is generally preferred.

The polymerization reaction is conducted at an elevated temperature. The maximum reaction temperature is realistically limited, to a significant degree, by any tendency of the resulting polycarbonate products to revert back to the cyclic monomeric reactants. The use and concentration of a catalyst can also influence the reaction temperature. In general, a temperature in the range of from about 50° C., and lower, to about 225° C. is suitable; a range from about 100° C. to about 180° C. is preferred.

In general, the reaction time will vary depending upon the operative temperature, the nature of the monomeric reactant(s) and initiator employed, the particular catalyst and concentration employed, the use of an inert normally liquid organic vehicle, and other factors. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The polycarbonate polymeric products can be prepared via the bulk polymerization, suspension polymerization, or the solution polymerization routes. The polymerization reaction can be carried out in the presence of an inert normally-liquid organic vehicle.

The polymerization reaction can be executed in a batch, semi-continuous, or continuous fashion. The reaction vessel can be a glass vessel, steel autoclave, elongated metallic tube, or other equipment and material employed in the polymer art. The order of addition of catalyst and monomeric reactant(s) does not appear to be critical. Unreacted monomer, if any, can be removed from the resulting reaction product mixture by heating under reduced pressure, e.g., at about 130° C. under 1 to 5 mm. of Hg.

The polycarbonate products obtained in accordance with the aforesaid processes have molecular weights generally upwards of about 600, although molecular weights below and substantially above this figure are obtainable if desired, for example, as low as about 300 (corresponding to a hydroxyl number of 374) to as high as about 7000, and even higher still to about 9000. With reactive vinyl polymers as initiators, the average molecular weight of the polycarbonate products can easily go as high as 14,000, and higher. Generally, however, the molecular weight ranges from about 300 to about 9000, preferably from about 800 to about 4500. The polycarbonates have reactive terminal hydroxyl groups(s), as explained hereinafter, the number of reactive hydroxyl group(s) depending upon the functionality of the initiator.

The preparation of the polycarbonate products in accordance with the aforesaid methods has a number of outstanding advantages. One that is unique and of utmost importance is that with or without the cyclic ester as a co-reactant(s) and/or catalyst, the polycarbonate products are formed with reactive end groups that are not blocked to any significant extent by ester groups, chlorine, or the like. Another very important advantage is that no water of condensation is formed and that consequently for many applications the need for drying is obviated. In addition, the aforesaid methods have the advantage of permitting accurate control over the average molecular weight of the polycarbonate products and further of promoting the formation of a substantially homogeneous polycarbonate in which the molecular weights of the individual molecules are reasonably close to the average molecular weight, that is, a narrow molecular weight distribution is obtained. This control is accomplished by preselecting the molar proportions of cyclic carbonate, with or without cyclic ester, plus initiator in a manner that will readily be appreciated by those skilled in the art. Thus, for example, if it is desired to form a polycarbonate in which the average molecular weight is approximately fifteen times the molecular weight of the initial carbonate or carbonate mixtures, then the molar proportions of carbonate or carbonate mixture to initiator utilized in the polymerization reaction are fixed at approximately 15:1 inasmuch as it is to be expected that on the average each molecule of initiator will add on an approximately equal number of carbonates and an average of fifteen carbonate molecules would be available to each molecule of initiator. In general, one can employ at least about two mols of cyclic carbonate(s), or at least about two mols of an admixture containing cyclic carbonate(s) and cyclic ester(s), per mol of organic initiator. It is desirable, however, to employ an admixture containing cyclic carbonate(s), initiator(s), with/without cyclic ester(s) so that there is provided a ratio of at least about two cyclic carbonate molecules (or two molecules from a cyclic carbonate-cyclic ester admixture) for each reactive hydrogen substituent, e.g., hydroxyl, primary amino, secondary amino, carboxyl, etc., on said initiator. In different language, it is desirable to employ amounts of the aforesaid cyclic compound(s) and initiator(s) so that there is provided a ratio of at least about two mols of the aforesaid cyclic compound per mol of the aforesaid illustrated reactive hydrogen substituent on said initiator. The upper limit re the molar proportion is readily fixed by the particular average molecular weight polycarbonate product that is desired.

Though not to be bound by theory or reaction mechanism, a hydroxyl or amino-containing initiator is believed to open the cyclic carbonate ring to produce a carbonate linkage or a urethane linkage (depending on the functionality of the initiator) having one or more terminal groups that are capable of opening further cyclic carbonate rings and thereby adding more and more cyclic carbonate to the growing molecule. Thus, for example, the polymerization of an admixture of 4,4-dimethyl-2,6-dioxycyclohexanone and an aliphatic alcohol initiator (ROH) at a mol ratio of $x$ mols of the carbonate per mol of the initiator would take place as follows:

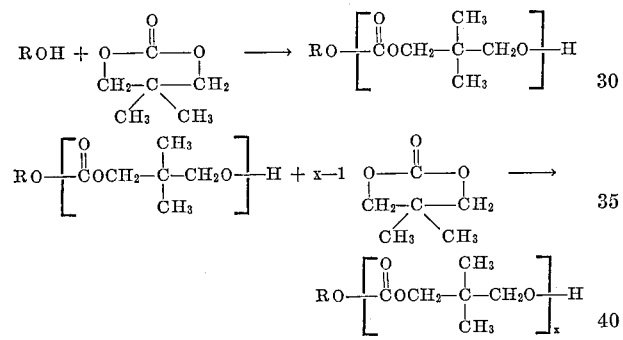

and wherein R (of the initiator and the resulting polycarbonate product) is an organic radical which can be an aliphatic, cycloaliphatic, aromatic, or heterocyclic radical.

In similar fashion, a monofunctional amine initiator ($RNH_2$ or $R_2NH$) opens and adds a succession of cyclic carbonate rings as shown below:

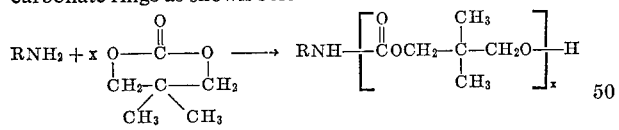

By way of a further illustration, the polymerization of the cyclic carbonate with a polyfunctional initiator, e.g., an amino alcohol ($HORNH_2$), is depicted below:

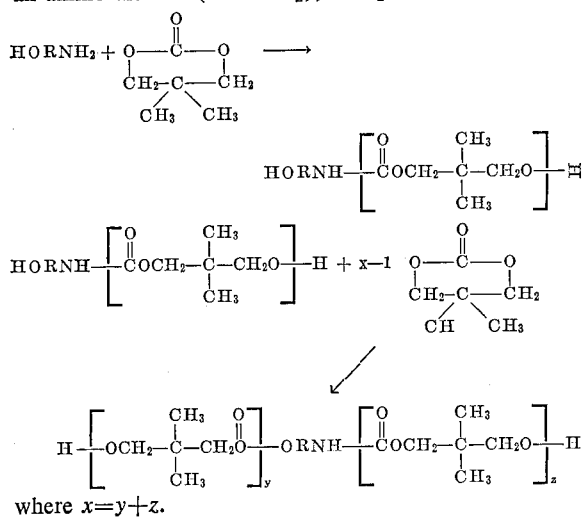

where $x=y+z$.

The polymerization reaction involving the cyclic carbonate with, for example, a polycarboxylic acid does not form polycarbonates which contain terminal carboxyl groups, i.e., the terminal group

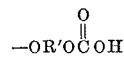

but rather, decarboxylation occurs during the polymerization reaction and the terminal group thus is hydroxyl, i.e., the terminal group —OR′OH. The following equation schematically illustrates a probable course of the reactions involved:

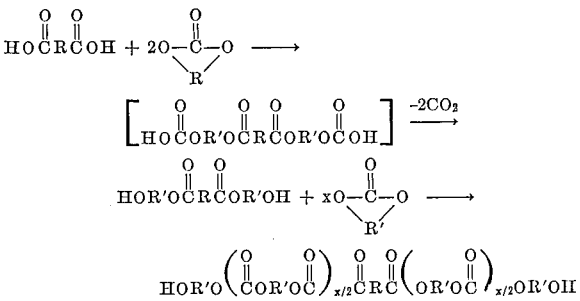

wherein R′ can represent, for example,

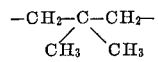

Furthermore, when the polymerization reaction involves a mixture of cyclic carbonate and cyclic ester (lactone) with, for example, a polycarboxylic acid, decarboxylation also occurs during the course of the reaction. The resulting polymer thus will be terminated by the unit —OR′OH (as illustrated previously) or the unit

wherein

is a linear lactone unit obtained by ring opening the corresponding lactone.

In summary, therefore, when a cyclic carbonate reacts with a functional group on the initiator such as (1) primary amino, —$NH_2$, (2) secondary amino, —NHR, (3) hydroxyl, —OH, or (4) carboxyl, —COOH, then the corresponding linkages which results from the aforesaid reactions are (1) a urethane group,

(2) a substituted urethane group,

(3) a carbonate group,

or (4) an ester group,

respectively. The corresponding end groups of the products which result from the aforesaid reactions, if terminated by an essentially linear carbonate unit, are (1) hydroxyl, (2) hydroxyl, (3) hydroxyl, and (4) hydroxyl (resulting from the decarboxylation of the unit

to the unit (—OR′OH), respectively).

The preceding discussion is to be compared with the reaction of a functional group on the initiator such as (1) primary amino, (2) secondary amino, (3) hydroxyl, or (4) carboxyl, with a cyclic ester (lactone) which may occur when one employs a mixture containing cyclic ester and cyclic arbonate. In these reactions, the corresponding linkages are (1) an amido group,

(2) a substituted amido group,

(3) an ester group,

or (4) an ester group,

respectively. The corresponding end groups of the products which result from these latter reactions, if terminated by an essentially linear lactone unit, are (1) hydroxyl, (2) hydroxyl, (3) hydroxyl, or (4) hydroxyl, respectively.

It is pointed out at this time that though the aforesaid equations supra have been exemplified by the common unit

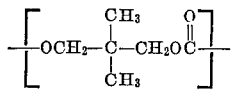

the generic unit can be obviously designated as

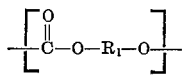

wherein $R_1$ represents a divalent aliphatic chain which contains at least 3 carbon atoms, and which is free from ethylenic and acetylenic unsaturation, said $R_1$ being monovalently bonded to both oxy atoms (—O—) in the aforesaid structural unit through carbon atoms, and further said $R_1$ containing no more than 4 substituents along the aliphatic chain. Accordingly, the term "polycarbonate" has been used in this specification including the appended claims to encompass those compounds which contain on the average, at least two

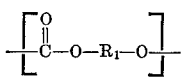

units such as those which result from the aforesaid reactions which involve a mixture containing a cyclic carbonate (with or without additional cyclic carbonate(s) and/or cyclic ester(s) and/or catalyst) plus an organic functional initiator. Furthermore, the term "polycarbonate" also encompasses those products which contain on the average, at least one

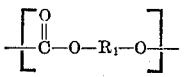

unit, and at least one

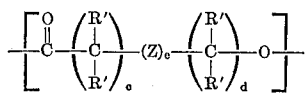

unit, wherein the variables R', Z, c, d, and e have the values (and provisos) set forth in the discussion concerning Formula II supra. Lastly, the term "polymerization reaction(s) or process(es)" has been used as a matter of convenience to designate the aforesaid reactions of an admixture which contains at least one cyclic carbonate and at least one initiator.

Thus, from the foregoing discussion, the contemplated plasticizers which result from the aforesaid polymerization reactions can be characterized as follows:

(III) 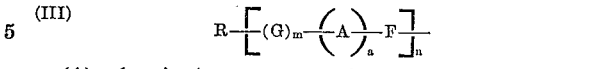

(1) wherein A represents at least one unit (IV) of the formula (IV) 

$R_1$ representing a divalent aliphatic chain which contains at least three carbons therein, and which is free from ethylenic and acetylenic unsaturation, said $R_1$ being monovalently bonded to both oxy atoms, (—O—) is the aforesaid unit through carbon atoms, and said $R_1$ containing no more than four substituents along the aliphatic chain; in addition to at least one unit IV supra, at least one unit V of the formula

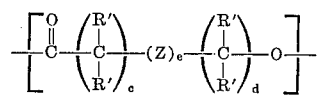

wherein $R_1$ has the aforesaid values; wherein each R' is of the group consisting of hydrogen, alkyl, halo, haloalkyl, alkoxyalkyl, and alkoxy; wherein Z is of the group consisting of oxy and the unit

wherein c is an integer of from 1 to 4; wherein d is an integer of from 1 to 4; and wherein e is an integer having a value of zero or one;

(2) wherein the subscripts a and n are numbers, n being at least one when a averages at least two, and n being at least two when a averages at least one;

(3) wherein m is zero or one;

(4) wherein R is the organic radical from the initiator (minus the involved functional group) such as an aliphatic, cycloaliphatic, aromatic, or heterocyclic radical;

(5) wherein G is a divalent radical of the group consisting of —O—, —NH—, and —NR″—, said G being bonded to R and the carbonyl moiety of a unit defined in A above, R″ being a hydrocarbon radical such as alkyl, aryl, aralkyl, cycloalkyl, and alkaryl; and (6) wherein F is of the group consisting of hydrogen, acyl, or a monovalent hydrocarbon radical as defined supra; with the provisos that (a) with reference to Unit V supra, the sum of $c+d+e$ cannot equal three; (b) with reference to unit V supra, the R' variables contained therein does not exceed three; and (c) with reference to unit V supra, the carbon atom adjacent to the oxy atom contains at least one hydrogen substituent thereon. It is understood, of course, that where a plurality of units as defined under the variable A in Formula III supra are linked together, such linkage is effected by monovalently bonding the oxy moiety of one unit to the carbonyl moiety of an adjacent unit (or vice-versa). In different language, the bonding between the units does not result in the

or —O—O— groupings. It is further readily appreciated that when m is zero, then R is monovalently bonded to the carbonyl moiety of a unit defined in A.

With further reference to Formula III supra, it is readily apparent that n is a number equal to the functionality of the initiators, i.e., at least one. Moreover, the subscript a preferably is a number large enough to make the total average molecular weight of the polycarbonate at least about 300, more suitably at least about 600 and upwards to about 9000, and higher, and preferably from about 800 to about 4500. The number of A groups in the final polycarbonate will depend in large part upon the molar ratio of cyclic carbonate (or cyclic carbonate plus cyclic ester) to initiator as previously explained. As indicated previously, the F variables, in addition to being hydrogen can also be acyl or a hydrocarbon radical. As described hereinafter, the esterification or etherification of the reactive hydroxyl terminal group(s) of the polycarbonates results in converting the said hydroxyl group(s) to acyl or hydrocarbyl groups, respectively.

With reference to Formula III supra, particularly preferred plasticizers are those in which Unit IV supra is (VI) 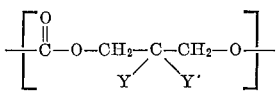

wherein Y and Y' have the values set out in Formula I supra.

In highly preferred aspects of the invention, Unit VI above is as follows:

(VII) 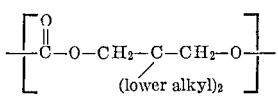

wherein each lower alkyl variable contains from 1 to 6 carbon atoms, preferably 1 to 2 carbon atoms, and preferably still each lower alkyl is methyl; and/or (VIII) 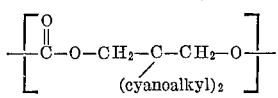

wherein each cyanoalkyl variable contains from 1 to 4 carbon atoms, and preferably wherein each cyanoalkyl variable is cyanomethyl; and/or (IX) 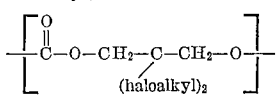

wherein each haloalkyl variable contains from 1 to 4 carbon atoms, and preferably wherein each haloalkyl variable is chloromethyl; and/or (X) 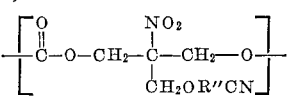

wherein R'' is alkylene, preferably alkylene of 2 to 4 carbon atoms, and preferably still R'' is ethylene ($-CH_2CH_2-$); and/or (XI) 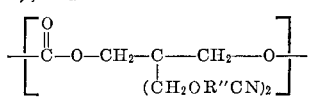

wherein each R'' has the meanings assigned to Unit X above.

With continued reference to Formula III above, the particularly preferred plasticizers are those in which Unit V is (XII) 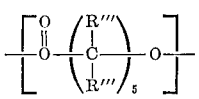

wherein each R''' is hydrogen or lower alkyl, preferably hydrogen or methyl, with the provisos that no more than 3 R''' variables are substituents other than hydrogen, and that the carbon atom adjacent to the oxy atom contains at least one hydrogen substituent thereon.

Referring further to Formula III supra, eminently preferred plasticizers are those which contain at least one unit designated as VII through XI supra and at least one Unit XII supra, and wherein F is acyl or hydrocarbyl.

The proportions of each Unit IV and Unit V (as well as those preferred units encompassed therein) in the plasticizers can be from about 3 to about 97 mol percent (based on the total mols of the appropriate monomers polymerized herein). It is preferred that the products under consideration contain from about 50 to about 5 mol percent, preferably still from about 40 to about 10 mol percent of Unit IV, and from about 50 to about 95 mol percent, preferably still from about 60 to about 90 mol percent of Unit V characterized therein.

While the aforesaid polycarbonate products, especially those having no more than one reactive terminal hydroxyl group are attractive as plasticizers, these products can readily be made even more attractive by acylation or etherification of their reactive hydroxyl terminal group(s) to reduce water extractability. Thus, the highly preferred plasticizers for the novel plasticized compositions are those in which the aforesaid illustrated terminal groups have been acylated or etherified by known reactions. Thus, esterification can be effected with organic acids which contain one carboxyl group as exemplified by various aliphatic carboxylic acids such as the alkanoic acids, the cycloalkanecarboxylic acids, alkyl monoester of dicarboxylic acids, e.g., acetic acid, propionic acid, butyric acid, 2-ethylhexanoic acid, dodecanoic acid, cyclohexanecarboxylic acid, 2-ethylhexyl monoester of adipic acid, etc., and various anhydrides of the formula $(RCO)_2O$ wherein each R is hydrocarbyl such as acetic anhydride, propionic anhydride, acetic butyric anhydride, etc. The etherification of one or more of the reactive hydroxyl terminated group(s) can be accomplished by procedure well documented in the literature such as by reaction of the polycarbonate with dihydrocarbyl sulfate (wherein each hydrocarbyl is alkyl, cycloalkyl, aralkyl, etc.), e.g., dimethyl sulfate, diethyl sulfate, etc., in the presence of base, e.g., NaOH, thus yielding polycarbonates with hydrocarbyloxy terminal group(s), e.g., alkoxy, cycloalkoxy, etc.

The polycarbonate products described in this specification are eminently suitable as plasticizers for various plasticizable solid polymeric materials, especially those polymeric materials which are prepared from at least one monomer which contains the group $CH_2=C<$ such as the vinyl and vinylidene resins, for example; the polyvinyl chlorides; the vinyl chloride-vinyl acetate copolymers; the vinyl chloride-vinylidene chloride copolymers; the polyvinylidene chlorides; the vinylidene chloride-acrylonitrile copolymers, the polyvinyl acetals; the polyvinyl butyrals; the polystyrenes; the poly(methyl acrylates); the vinyl chloride-acrylonitrile copolymers; the acrylonitrile-vinyl chloride-vinylidene chloride copolymers; natural rubber; the polybutadienes; the polyisoprenes; the butadiene-acrylonitrile copolymers; the chloroprenes; the butadiene-styrene copolymers; the ethylene-propylene copolymers; and the like. The aforesaid solid polymeric materials are well known in the art.

The amount of plasticizing agent which can be employed is readily ascertainable by those possessing ordinary skill in the plasticizing art. The plasticizing agent of choice, the molecular weight of the plasticizing agent, the particular resin to be plasticized, the incorporation of additional additives such as stabilizers etc., into the system, and other well known factors will influence, to an extent, the quantity of plasticizer to be used for optimum results. Consequently, by the term "plasticizing amount," as used herein including the appended claims, is meant that quantity of plasticizing agent which will appreciably increase the flexibility, processability, workability, and/or distensibility of the material with which it is admixed. The concentration of polycarbonate plasticizer in the resin can be within the range of from about 10 to about 125 parts per 100 parts of resin, although concentrations above and below the aforesaid range can be employed. Thus, as little as one part of the polycarbonate plasticizers to 100 parts of the resin may have a measurable effect on the stiffness of the mixture while the upper limit would be determined by the degree of flexibility that the end use might require.

In addition to the aforesaid exemplary polycarbonate plasticizers, the novel plasticized compositions can contain various plasticizers, e.g., di(2-ethylhexyl) phthalate, epoxidized esters such as di(2-ethylhexyl) 4,5-epoxycyclohexane-1,2-dicarboxylate, epoxidized soya bean oil, etc.; stabilizers such as metallic fatty acid soaps, dibutyl tin maleate, etc.; and other well known additives.

In general, any one of several known methods of mixing and fluxing can be utilized in the preparation of the novel plasticized compositions of the invention. For instance, the resin and plasticizer can be intimately dispersed by stirring or tumbling and the admixture fluxed into a continuous sheet on a stream-heated roll mill. Other methods of mixing and fluxing, such as a banbury cycle followed by calendering can also be employed.

The preparation of 4-nitro-4-hydrocarbyloxymethyl-2,6-dioxacyclohexanone or 4-nitro-4-acyloxymethyl-2,6-dioxacyclohexanone, etc., is effected by the following sequence of steps:

(1)
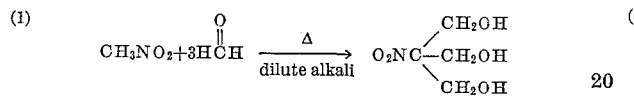

Equation 1 supra represents an aldol-like condensation reaction which can be conducted in the presence of a basic catalyst, e.g., a dilute alkali metal hydroxide solution, at a moderately elevated temperature. The product, i.e., tris(hydroxymethyl)nitromethane, is then contacted with a hydrocarbyl halide or an acyl halide which is designated as R″X in Equation 2 below:

(2)
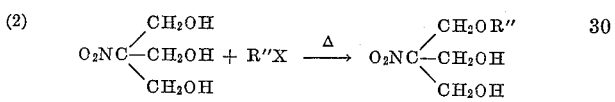

The resulting monoetherified product or monoesterified product, as may be the case, then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the nitro substituted carbonate compound. Alternatively, the product of Equation 2 can be reacted with the dialkyl carbonates

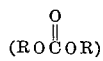

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_3$ and $Y_4TiO_4$ in which the Y's are alkyl aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. Equation 3 infra illustrates the cyclization step whereby the nitro substituted carbonate compound is formed.

(3)
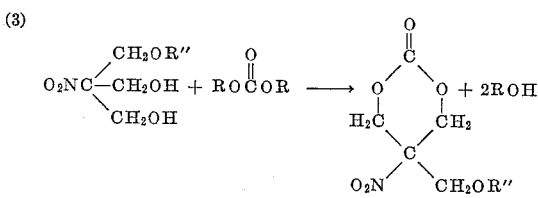

The R″ radical in Equation 3 above is hydrocarbyl or acyl.

The 4-nitro-4-hydrocarbyl-2,6-dioxacyclohexanones can be prepared by the reaction of a hydrocarbyl substituted nitromethane, i.e., $RCH_2NO_2$ wherein R is an alkyl, aryl, cycloalkyl, aralkyl, alkaryl, etc., with an excess of formaldehyde, as shown in the following equation:

(4)
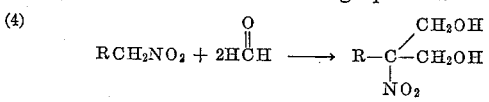

The resulting 2-nitro-2-hydrocarbyl-1,3-propanediol compound in Equation 4 then can be subjected to the cyclization step illustrated in Equation 3 supra, thus producing the corresponding various nitro substituted carbonates.

The preparation of 4,4-di(hydrocarbyl)-2,6-dioxacyclohexanone is accomplished by an aldol condensation of the appropriate aldehyde which contains one alpha hydrogen atom, with formaldehyde, followed by a Cannizzaro reaction with additional formaldehyde. Equation 5 depicts the over-all reaction:

(5)
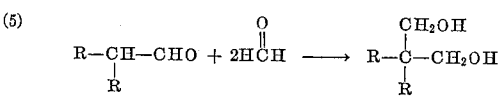

Both R's in Equation 5 represent hydrocarbyl groups. The resulting 2,2-di(hydrocarbyl)-1,3-propanediol then can be subjected to the cyclization step discussed in Equation 3 to yield 4,4-di(hydrocarbyl)-2,6-dioxacyclohexanone.

The preparation of 4-hydrocarbyl-4-hydrocarbyloxymethyl-2,6-dioxacyclohexanone or 4-hydrocarbyl-4-acyloxymethyl-2,6-dioxacyclohexanone is conveniently prepared by employing an aldehyde which contains two alpha hydrogen atoms in Equation 5 supra, that is:

(6)
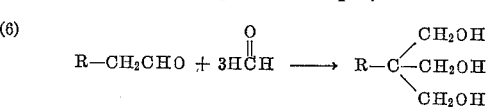

The resulting 1-hydrocarbyl-1,1,1-trimethylolmethane then can be reacted with R″X of Equation 2 supra, followed by the cyclization step of Equation 3 to obtain the cyclic carbonate under consideration.

The 4,4-di(hydrocarbyloxymethyl)-2,6-dioxacyclohexanones or 4,4-di(acyloxymethyl)-2,6-dioxacyclohexanones are prepared by the reaction of pentaerythritol with sufficient R″X (note Equation 2) to produce the diether or diester of pentaerythritol which, in turn, can be cyclized (note Equation 3) to yield the corresponding carbonates. Equation 7 below illustrates the over-all reaction.

(7)
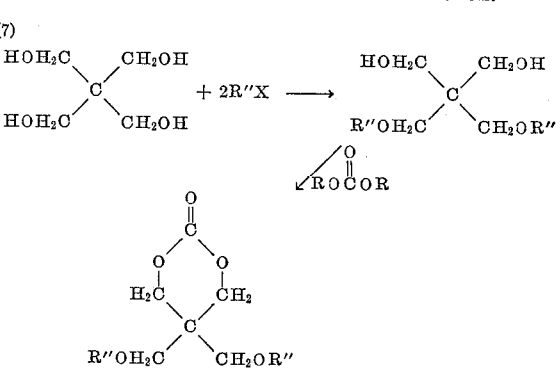

The 4-substituted-4-cyanoalkoxymethyl-2,6-dioxacyclohexanones wherein the 4-substituted moiety is hydrocarbyl or nitro such as those illustrated previously can be prepared by reacting a molar excess of 1-hydrocarbyl-1,1,1-trimethylolmethane or 1-nitro-1,1,1-trimethylolmethane with an alpha, beta-unsaturated nitrile such as the 2-alkenenitriles, e.g., acrylonitrile, and then cyclizing the 2-substituted-2-cyanoalkoxymethyl-1,3-propanediol to the corresponding carbonate. The 4,4-di(cyanoalkoxymethyl)-2,6-dioxacyclohexanones prepared by reacting one mol of pentaerythritol with two mols of 2-alkenenitrile, e.g., acrylonitrile, to yield 2,2-di(cyanoalkoxymethyl)-1,3-propanediol, followed by cyclizing to produce the subject carbonate.

The various 3- and/or 4- and/or 5-hydrocarbyl-2,6-dioxacyclohexanones can be prepared by cyclizing the appropriate mono-, di-, or trisubstituted 1,3-propanediol to produce the corresponding cyclic carbonate.

The 4,4-di(halomethyl)-2,6-dioxacyclohexanones such as 4,4-di(chloromethyl)-2,6-dioxacyclohexanone can be prepared by cyclizing pentaerythritol dichloride with dialkyl carbonate; 2,2-di(cyanomethyl) - 2,6 - dioxacyclohexanone can be prepared by reacting one mol of pentaerythritol dichloride with two mols of an alkali metal cyanide to thus yield the 2,2-di(cyanomethyl)-1,3-propanediol which, in turn, can be cyclized to give the subject carbonate; 3-chloromethyl-2,6-dioxacyclohexanone and 3-cyanomethyl-2,6-dioxacyclohexanone prepared by cyclizing 4-chloro-1,3-butanediol and 4-cyano-1,3-butanediol, respectively.

Plasticized compositions are prepared by fluxing the polycarbonate compositions of the illustrative examples *infra* with resins on a two-roll mill at the temperatures indicated until a clear resinous sheet is obtained. Test specimens are prepared by molding at 158° C. in accordance with the various tests outlined below.

The mixtures of alkyl-substituted epsilon-caprolactones described in the following examples are prepared from the alkyl-substituted cyclohexanones according to the method described by Starcher and Phillips in JACS 80, 4079 (1958). Accordingly by way of example, a mixture of alpha-methyl- and epsilon-methyl-epsilon-caprolactones is synthesized by reacting 2-methylcyclohexanone, which can be obtained by the hydrogenation of orthocresol to 2-methylcyclohexanol followed by dehydrogenation of said secondary alcohol to the corresponding ketone, with peracetic acid. By utilization of 3-methylcyclohexanone as the coreactant with peracetic acid there is obtained a mixture of beta-methyl- and delta-methyl-epsilon-caprolactones. The 3-methylcyclohexanone can be synthesized by hydrogenation of meta-cresol to 3-methylcyclohexanol followed by dehydrogenation of said alcohol to the corresponding ketone. Reaction of 4-methylcyclohexanone with peracetic acid yields gamma-methyl-epsilon-caprolactone. The 4-methylcyclohexanone is obtained from para-cresol in identical manner as the other substituted cyclohexanones.

By the foregoing methods it is also feasible to prepare mixtures of dimethyl-substituted-epsilon-caprolactones, and higher alkyl-substituted-epsilon-caprolactones. For example, mixtures of dimethyl-substituted epsilon-caprolactones may be obtained from xylenol mixtures commercially known as "cresylic acids." These phenolic mixtures upon hydrogenation and dehydrogenation as described above yield mixtures of dimethyl-substituted cyclohexanones. Reaction of such dimethyl-substituted cyclohexanones with peracetic acid results in dimethyl-substituted-epsilon-caprolactones. Other commercial products which are of importance are the cresols obtained from coal tars or from the petroleum industry. For example, mixtures of ortho-, meta-, and para-cresol, or mixtures of meta- and para-cresol upon conversion to methyl-cyclohexanones and reaction with peracetic acid will yield mixtures of methyl-substituted-epsilon-caprolactones.

In the following illustrative examples, various polycarbonates are evaluated as plasticizers for vinyl resins. In reporting the physical properties of the plasticized vinyl resin compositions certain symbols and abbreviations are employed. Unless otherwise indicated, they are defined as follows:

(1) $T_B$ (brittle temperature) is a measure of flexibility at low temperature and is determined by an impact test in accordance with ASTM Method D 746–55T.

(2) Oil Extraction (test temperature of 50° C.) determined in accordance with the formula:

$$E_1 = \frac{100(W_1 - W_2)}{W_2}$$

wherein $E_1$ is the weight percent extraction of plasticizer, wherein $W_1$ is the original weight of the plasticized sample (four mil film), and wherein $W_2$ is the final weight of the plasticized sample after subjecting sample to mineral oil extraction test for a period of time, followed by drying in a circulating air oven at 70° C. for 30 minutes.

(3) Tensile, or ultimate strength, is measured on a Scott L–6 Tensile Tester using annular specimens (1.75" I.D. and 2.00" O.D-0.060" to 0.080" thick). The L–6 is operated at a constant rate of elongation of 4 feet per minute at 25° C.

(4) Elongation (or percent ultimate elongation) is the increase in length at rupture with the sample at 24° C.

(5) ASTM stiffness modulus, or flexural stiffness at 24.5° C., is measured with a Tinius Olsen Flexural Stiffness Tester, in accordance with ASTM Method D747–50.

(6) Temperature-stiffness characteristics, $T_F$ and $T_4$, are determined with a Clash-Berg Torsional Stiffness Tester in accordance with ASTM Method D1043–51. The values listed as $T_F$ and $T_4$ are the temperature at which a torsional stiffness of 135,000 and 10,000 p.s.i., respectively, are reached.

(7) Volatility is determined in a 24-hour, activated carbon test at 70° C., in accordance with ASTM Method D1203–55.

(8) Durometer "A" hardness is a measure of resistance of indentation of an 0.25 inch specimen by a pin equipped with a truncated cone point as described in ASTM Method D–676–49T.

(9) $I_r$ = Reduced viscosity value of plasticizer 100 milliliters of a given solvent at given temperature. The reduced viscosity values of the polycarbonate plasticizers are determined at a concentration of 0.2 gram of said polycarbonate per 100 milliliters of chloroform at 30° C. The inherent viscosity of the plasticizable resin, unless otherwise indicated, is determined at a concentration of 0.2 gram of said resin per 100 milliliters of cyclohexanone at 30° C.

In the following examples, the proportion of the components are in parts by weight. The weight percent of the plasticizer is based on the weight of plasticizable resin.

EXAMPLE 1

A polycarbonate is prepared by reacting 7.4 parts of n-butanol, 114 parts of epsilon-caprolactone, 39 parts of 4,4-dimethyl-2,6-dioxacyclohexanone, and 0.05 part of stannous dioctanoate catalyst at 150° C. for a period of 6 hours. The resulting polycarbonate has a hydroxyl number of 34.6, and a molecular weight of about 1600.

Poly(vinyl chloride) is mechanically mixed with 46 weight percent of the above polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), low oil and water extraction, and extremely low volatile loss.

EXAMPLE 2

A polycarbonate is prepared by reacting 7.4 parts of n-butanol, 114 parts of epsilon-caprolactone, 39 parts of 4,4-dimethyl-2,6-dioxacyclohexanone, and 0.1 part of tetraisopropyl titanate catalyst at 160° C. for a period of 4 hours. The resulting polycarbonate has a hydroxyl number of 34.4, and a molecular weight of about 1600. One hundred grams of the above polycarbonate is reacted with 30 grams of acetic anhydride at 100° C. for a period of 5 hours. Excess anhydride and acetic acid are removed via distillation under reduced pressure.

Poly(vinyl chloride) is mechanically mixed with 40 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 3

A polycarbonate is prepared by reacting 126 parts of 2-ethylhexanol, 998 parts of epsilon-caprolactone, 260 parts of 4,4-dimethyl-2,6-dioxacyclohexanone, and 0.2 part of lead 2-ethylhexanoate catalyst at 150° C. for a period of 8 hours. The resulting polycarbonate has a hydroxyl number of 40.5, and a molecular weight of about 1400. Two hundred grams of the above polycarbonate is reacted with 50 grams of acetic anhydride at 80° C. for a period of 6 hours. Excess anhydride and acetic acid are removed via distillation under reduced pressure.

Poly(vinyl chloride) is mechanically mixed with 48 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 4

A polycarbonate is prepared by reacting 126 parts of 2-ethylhexylamine, 228 parts of epsilon-caprolactone, 260 parts of 4,4-dimethyl-2,6-dioxacyclohexanone, and 0.2 part of tetrabutyltitanate catalyst at 150° C. for a period of 4 hours. The resulting polycarbonate has a hydroxyl number of 91.0, and a molecular weight of about 600. Two hundred grams of the above polycarbonate is reacted with 50 grams of acetic anhydride at 100° C. for a period of 4 hours. Excess anhydride and acetic acid are removed via distillation under reduced pressure.

Poly(vinyl chloride) is mechanically mixed with 47 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 5

A polycarbonate is prepared by reacting 45 parts of ethylamine, 640 parts of a mixture of methyl-substituted epsilon-caprolactones, 260 parts of 4,4-dimethyl-2,6-dioxacyclohexanone, and 0.2 part of stannic tetraacetate catalyst at 140° C. for a period of 8 hours. The resulting polycarbonate has a hydroxyl number of 59.5, and a molecular weight of about 950. Two hundred grams of the above polycarbonate is reacted with 50 grams of acetic anhydride at 100° C. for a period of 5 hours. Excess anhydride and acetic acid are removed via distillation under reduced pressure.

Poly(vinyl chloride) is mechanically mixed with 40 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 6

A polycarbonate is prepared by reacting 134 parts of dipropylene glycol, 228 parts of epsilon-caprolactone, 130 parts of 4,4-dimethyl-2,6-dioxacyclohexanone, and 0.2 part of dibutyltin oxide catalyst at 150° C. for a period of 4 hours. The resulting polycarbonate has a hydroxyl number of 221, and a molecular weight of about 500. Two hundred grams of the above polycarbonate is reacted with 50 grams of acetic anhydride at 100° C. for a period of 5 hours. Excess anhydride and acetic acid are removed via distillation under reduced pressure.

Poly(vinyl chloride) is mechanically mixed with 47 weight percent of the above acetylated polycarbonate. The resulting admixture of vinyl resin and plasticizer is fluxed on a steam-heated two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 7

A polycarbonate is prepared by reacting 76 parts of isopropanolamine, 1140 parts of epsilon-caprolactone, 520 parts of 4,4-dimethyl-2,6-dioxacyclohexanone, and 0.2 part of dibutyltin dilaurate catalyst at 140° C. for a period of 10 hours. The resulting polycarbonate has a hydroxyl number of 66, and a molecular weight of about 1700. Two hundred grams of the above polycarbonate is reacted with 40 grams of acetic anhydride at 80° C. for a period of 6 hours. Excess anhydride and acetic acid are removed via distillation under reduced pressure.

Poly(vinyl chloride) is mechanically mixed with 42 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 8

A polycarbonate is prepared by reacting 116 parts of hexamethylenediamine, 1710 parts of epsilon-caprolactone, 650 parts of 4,4-dimethyl-2,6-dioxacyclohexanone, and 0.3 part of zinc acetate catalyst at 150° C. for a period of 10 hours. The resulting polycarbonate has a hydroxyl number of 46.8, and a molecular weight of about 2400. Two hundred grams of the above polycarbonate is reacted with 30 grams of acetic anhydride at 100° C. for a period of 4 hours. Excess anhydride and acetic acid are removed via distillation under reduced pressure.

Poly(vinyl chloride) is mechanically mixed with 45 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 9

A polycarbonate is prepared by reacting 122 parts of and 80:20 mixture of 2,4- and 2,6-toluenediamines, 1710 parts of epsilon-caprolactone, 290 parts of 4,4-dimethyl-2,6-dioxacyclohexanone, and 0.2 part of stannic tetrachloride catalyst at 120° C. for a period of 8 hours. The resulting polycarbonate has a hydroxyl number of 53.5, and a molecular weight of about 2100. Two hundred grams of the above polycarbonate is reacted with 30 grams of acetic anhydride at 80° C. for a period of 5 hours. Excess anhydride and acetic acid are removed via distillation under reduced pressure.

Poly(vinyl chloride) is mechanically mixed with 50 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., very low oil and water extraction, and extremely low volatile loss.

EXAMPLE 10

A polycarbonate is prepared by reacting 13.8 parts of pentaerythritol, 570 parts of epsilon-caprolactone, 128 parts of a mixture of methyl-substituted epsilon-caprolactones, 130 parts of 4,4-dimethyl-2,6-dioxacyclohexanone, and 0.3 parts of dibutyltin oxide catalyst at 160° C. for a period of 8 hours. The resulting polycarbonate has a hydroxyl number of 26.8, and a molecular weight of about 8400. Two hundred grams of the above polycarbonate is reacted with 30 grams of acetic anhydride at 100° C. for a period of 4 hours. Excess anhydride and acetic acid are removed via distillation under reduced pressure.

Poly(vinyl chloride) is mechanically mixed with 45 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 11

A polycarbonate is prepared by reacting 10.3 parts of diethylenetriamine, 342 parts of epsilon-caprolactone, 150 parts of a mixture of dimethyl-substituted epsilon-caprolactone, 130 parts of 4,4-dimethyl-2,6-dioxacyclohexanone, and 0.2 part of dibutyltin oxide catalyst at 160° C. for a period of 8 hours. The resulting polycarbonate has a hydroxyl number of 26.5, and a molecular weight of about 6300. Two hundred grams of the above polycarbonate is reacted with 30 grams of acetic anhydride at 100° C. for a period of 5 hours. Excess anhydride and acetic acid are removed via distillation under reduced pressure.

Poly(vinyl chloride) is mechanically mixed with 40 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., very low oil and water extraction, and extremely low volatile loss.

EXAMPLE 12

A polycarbonate is prepared by reacting 62 parts of ethylene glycol, 1140 parts of epsilon-caprolactone, 300 parts of 4-methyl-4-nitro-2,6-dioxacyclohexanone, and 0.2 part of di-2-ethylhexyltin oxide catalyst at 125° C. for a period of 8 hours. The resulting polycarbonate has a hydroxyl number of 74.0, and a molecular weight of about 1500. Two hundred grams of the above polycarbonate is reacted with 35 grams of acetic anhydride at 80° C. for a period of 6 hours. Excess anhydride and acetic acid are removed via distillation under reduced pressure.

Poly(vinyl chloride) is mechanically mixed with 40 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 13

A polycarbonate is prepared by reacting 6.2 parts of ethylene glycol, 114 parts of epsilon-caprolactone, 42 parts of 4-ethyl-4-cyanoethoxymethyl-2,6-dioxacylohexanone, and 0.2 part of stannous dioleoate catalyst at 140° C. for a period of 8 hours. The resulting polycarbonate has a hydroxyl number of about 70.2, and a molecular weight of about 1600. One hundred grams of the polycarbonate is reacted with 20 grams of acetic anhydride at 90° C. for a period of 4 hours. Excess anhydride and acetic acid are removed via distillation under reduced pressure.

Poly(vinyl chloride) is mechanically mixed with 45 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

EXAMPLE 14

A polycarbonate is prepared by reacting 6.2 of ethylene glycol, 114 parts of epsilon-caprolactone, 18.7 parts of 4,4-di(chloromethyl)-2,6-dioxacyclohexanone, and 0.2 part of dibutyltin dimaleate catalyst at 140° C. for a period of 8 hours. The resulting polycarbonate has a hydroxyl number of 83.2, and molecular weight of about 1350. One hundred grams of the above polycarbonate is reacted with 20 grams of acetic anhydride at 100° C. for a period of 4 hours. Excess anhydride and acetic acid are removed via distillation under reduced pressure.

Poly(vinyl chloride) is mechanically mixed with 47 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., very low oil and water extraction, and extremely low volatile loss.

EXAMPLE 15

A polycarbonate is prepared by reacting 6.2 parts of ethylene glycol, 195 parts of 4,4-dimethyl-2,6-dioxacyclohexanone, and 0.1 part of stannous dioctanoate catalyst at 120° C. for a period of 10 hours. The resulting polycarbonate has a hydroxyl number of 56.0, and a molecular weight of about 2000. One hundred grams of the above polycarbonate is reacted with 20 grams of acetic anhydride at 80° C. for a period of 4 hours. Excess anhydride and acetic acid are removed via distillation under reduced pressure.

Poly(vinyl chloride) is mechanically mixed with 40 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low oil and water extraction, and low volatile loss.

EXAMPLE 16

A polycarbonate is prepared by reacting 6.2 parts of ethylene glycol, 195 parts of 4,4-dimethyl-2,6-dioxacyclohexanone, 54 parts of 4,4-di(cyanomethyl)-2,6-dioxacyclohexannoe, and 0.1 part of stannous dioctanoate catalyst at 130° C. for a period of 6 hours. The resulting polycarbonate has a hydroxyl number of 45.0, and a molecular weight of about 2500. Two hundred grams of the above polycarbonate is reacted with 25 grams of acetic anhydride at 90° C. for a period of 6 hours. Excess anhydride and acetic acid are removed via distillation under reduced pressure.

Poly(vinyl chloride) is mechanically mixed with 45 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low oil and water extraction, and low volatile loss.

EXAMPLE 17

A hydroxyl terminated product is prepared by reacting 43.2 parts of adipic acid, 67 parts of dipropylene glycol, 114 parts of epsilon-caprolactone, and 0.3 part of tetrabutyl titanate catalyst at 180° C. for a period of 12 hours. Water of reaction is removed via distillation and the product is finally subjected to a vacuum of 10 mm. Hg at 180° C. for 3 hours. Thereafter, 65 parts of 4,4-dimethyl-2,6-dioxacyclohexanone is added thereto, and the resulting admixture is heated to about 140° C. for a period of 7 hours. The resulting polycarbonate has a hydroxyl number of 38.2, a carboxyl number of 0.5, and a molecular weight of about 2900. Two hundred grams of the above polycarbonate is reacted with 30 grams of acetic anhydride at 100° C. for a period of 4 hours. Excess anhydride and acetic acid are removed via distillation under reduced pressure.

Poly(vinyl chloride) is mechanically mixed with 45 weight percent of the above acetylated polycarbonate. The resulting admixture of vinyl resin and plasticizer is fluxed on a steam-heated, two-roll mill at 158° C. The resulting plasticized composition is characterized by low stiffness modulus at 25° C., low brittle temperature ($T_B$, ° C.), very low oil and water extraction, and extremely low volatile loss.

It is also within the scope of the invention to form other polycarbonates which are useful as plasticizers. Example 17 supra illustrates one modification of the additional embodiments that are contemplated. Briefly, a molar excess (and up to 100 mols, and higher) of cyclic carbonate(s) or mixture comprising cyclic carbonate(s) and an epsilon-caprolactone(s) per mole of a glycol, a diamine, and/or an amino alcohol can be reacted together (the reactants and reaction conditions have been exemplified supra), to form hydroxyl-terminated polycarbonates which polycarbonates subsequently can be reacted at an elevated temperature, e.g., from about 125° C. and lower, to about 225° C., with a molar deficiency or a molar excess of a dicarboxylic acid such as those exemplified supra, to produce hydroxyl-terminated products or carboxyl-terminated products as may be the case, to wit:

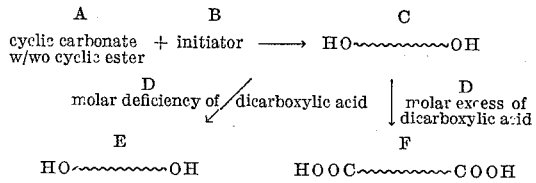

wherein A represents a cyclic carbonate or an admixture containing cyclic carbonate and an epsilon-caprolactone such as those illustrated previously; wherein B is a glycol, a diamine, or an amino alcohol such as those illustrated supra; wherein C is a hydroxyl-terminated polycarbonate which contains at least two Unit IV; or at least one Unit IV and at least one Unit XII which have been exemplified supra; wherein D is a dicarboxylic acid illustrated supra; wherein E is a hydroxyl-terminated polycarbonate which contains a plurality of Unit IV supra, e.g., at least four Unit IV (or at least two Unit IV plus at least two Unit XII), and in addition, contains at least one diacyl residue from the dicarboxylic acid, e.g.,

and wherein F is a carboxyl-terminated polycarbonate which contains, as terminal units, the unit

and, in addition, contains at least two Unit IV, or at least one Unit IV and at least one Unit XII. The carboxyl-terminated polycarbonate F may also contain at least one diacyl residue

and preferably, it contains a plurality of diacyl residues. The hydroxyl-terminated polycarbonates E can be readily esterified or etherified, as explained previously. The carboxyl-terminated polycarbonates F can be readily esterified in known manner by reaction with monohydric alcohols such as the alkanols, the cycloalkanols, the monoalkyl ethers of glycols, etc., e.g., 2-ethyl-1-butanol, 1-hexanol, 2-ethyl-1-hexanol, 3-heptanol, 2-butyl-1-octanol, 2,6,8-trimethyl-4-nonanol, 5-ethyl-2-nonanol, 7-ethyl-2-methyl-4-undecanol, 3,9-diethyl-6-tridecanol, cyclohexanol, ethylene glycol monobutyl ether, ethylene glycol monoethyl ether, diethylene glycol monoethyl ether, and diethylene glycol monobutyl ether.

It is to be understood that the glycols which can be employed as the initiator B supra, encompass those hydroxyl-terminated polyesters which result from the reaction of a molar excess of a diol with a dicarboxylic acid, ester, or halide. The preparation of the aforesaid hydroxyl-terminated polyesters are well documented in the literature.

Additionally, it is pointed out that the glycols which can be employed as the initiator B supra, also include the hydroxyl-terminated reaction products which result from the reaction of a molar excess of an epsilon-caprolactone, zeta-enantholactone, or hydroxyoctanoic acid lactone with an initiator such as a diamine, diol, or amino alcohol, in the absence of a catalyst, or in the presence of a catalyst, as explained in U.S. 2,878,236 and U.S. 2,890,208. The aforesaid two patents as well as their description of the lactones, initiators, and reaction conditions are incorporated by reference into this disclosure.

It is further pointed out that the dicarboxylic acids D supra include within their scope the carboxyl-terminated reaction products which are prepared by the reaction of an epsilon-caprolactone with a dicarboxylic acid as detailed in the aforesaid two patents which have been incorporated by reference.

Also within the scope of the invention is the incorporation of a lactone (such as those exemplified above) into the dicarboxylic acid D, and using the resulting admixture as reactants to form the polycarbonates identified as E and F supra. The latter two modifications result in products E and F above which contain at least one and preferably a plurality of units identified as Unit V supra with the exception that the sum of the variables $c+d+e$ equals 5 to 7 in said Unit V supra.

Other variations which are encompassed within the scope of the invention is the incorporation, with the initiator B, of a small quantity of triols, tetrols, pentol, hexols, etc., into the reaction mixture, providing the resulting polycarbonate C does not result in a cross-linked product. In addition to the dicarboxylic acid D, one can incorporate a small quantity of a higher polycarboxylic acid (tri-, tetra-, penta-, hexa-, etc.) into the reaction mixture so long as this resulting polycarbonate E or F is not a cross-linked product.

With reference to the aforesaid embodiments, optimum plasticizing properties are obtainable with esterified polycarbonates having molecular weights between about 800 and 4500 as exemplified supra.

A convenient method of measuring the molecular weight of the polycarbonate is to determine the average number of carboxyl and hydroxyl groups in a given amount of the polycarbonate.

The acid number (milligrams of KOH per gram of polycarbonate using phenolphthalein as an indicator) is a measure of the number of terminal carboxyl groups in a polycarbonate. The hydroxyl number, which is a measure of the number of terminal hydroxyl groups and is defined in terms of milligrams of KOH per gram of polycarbonate, is determined by adding pyridine and acetic anhydride to the polycarbonate and titrating the acetic acid formed with KOH as described in Ind. Eng. Chem., Anal. ed., vol. 16, pages 541–9 and in Ind. Eng. Chem., Anal. ed., vol. 17, page 394. The sum of the acid or carboxyl number and the hydroxyl number, referred to as the reactive number, is an indication of the average number of terminal groups present in the polycarbonate and therefore is in turn an indication of the number of molecules in the mass and the degree of polymerization. A polycarbonate containing long chain molecules will have a relatively low reactive number while a polycarbonate containing short chain molecules will possess a relatively high reactive number.

The molecular weight of the polycarbonate are readily calculable from the hydroxyl and carboxyl numbers and the functionality of the polycarbonate.

It is apparent that various modifications will readily occur to those skilled in the art upon reading this description. All such modifications are intended to be included within the scope of the invention as defined in the accompanying claims.

What is claimed is:

1. A vinyl resin plasticized composition comprising a vinyl resin and, as the plasticizer therefor, a polycarbonate having an average molecular weight of from about 300 to about 9000 and characterized by the formula

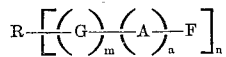

(1) wherein A is of the group consisting of (a) at least one unit (I) of the formula (I)
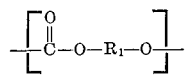

and (b) at least one unit (I) above plus at least one unit (II) of the formula (II)
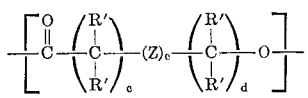

wherein $R_1$ represents a divalent aliphatic chain which contains from 3 to 18 carbon atoms therein, and which is free from ethylenic and acetylenic unsaturation, said $R_1$ being monovalently bonded to both oxy atoms in the abovesaid unit I through carbon atoms, and said $R_1$ containing no more than four substituents along the aliphatic chain; wherein each R', individually, is of the group consisting of hydrogen, alkyl of 1 to 6 carbon atoms, halo, haloalkyl of 1 to 4 carbon atoms, alkoxy of 1 to 8 carbon atoms, and alkoxyalkyl, the alkoxy moiety thereof having from 1 to 4 carbon atoms and the alkyl moiety thereof having from 1 to 3 carbon atoms; wherein $c$ is an integer of from 1 to 4; wherein $d$ is an integer of from 1 to 4; wherein $e$ is an integer having a value of zero or one; and wherein Z is of the group consisting of oxy and the unit

the R' variables of the foresaid unit having the same values as above;

(2) wherein the substituents $a$ and $n$ are numbers, $n$ being at least one when $a$ averages at least two, and $n$ being at least two when $a$ averages at least one;

(3) wherein $m$ is zero or one;

(4) wherein R is an organic radical which is free from ethylenic and acetylenic unsaturation and which is composed of atoms of the group consisting of (i) carbon and hydrogen atoms, (ii) carbon, hydrogen, and oxygen atoms, and (iii) carbon, hydrogen, and nitrogen atoms;

(5) wherein G is a divalent radical of the group consisting of —O—, —NH—, and —NR″—, said G being bonded to R and the carbonyl moiety of a unit defined in A above, and R″ being a hydrocarbon radical; and (6) wherein F is of the group consisting of hydrogen, acyl, and a monovalent hydrocarbon radical; with the provisos that (a) with reference to unit II above, the sum of $c+d+e$ cannot equal three; (b) with reference to unit II above, the R' variables contained therein does not exceed three, and (c) with reference to unit II above, the carbon atom adjacent to the oxy atom contains at least one hydrogen substituent thereon.

2. The plasticized composition of claim 1 wherein the average molecular weight of said polycarbonate is in the range of from about 800 to about 4500.

3. The plasticized composition of claim 1 wherein said unit II has the formula

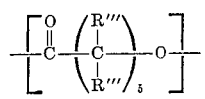

wherein R‴ is of the group consisting of hydrogen and lower alkyl; with the provisos that (a) the R‴ variables do not exceed three, and (b) the carbon atom adjacent to the oxy atom in the above unit contains at least one hydrogen substituent thereon.

4. A plasticized composition consisting essentially of a vinyl chloride resin and vinylidene resins and, as the plasticizer therefor, a polycarbonate having an average molecular weight of from about 300 to about 9000 and characterized by the formula $R(GAF)_n$ (1) wherein A' represents at least one unit (I) of the formula (I)
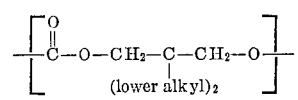

and at least one unit (II) of the formula (II)
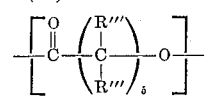

each R‴ being of the group consisting of hydrogen and lower alkyl; (2) wherein $n$ is at least one; (3) wherein R is an organic radical which is free from ethylenic and acetylenic unsaturation and which is composed of atoms of the group consisting of (i) carbon and hydrogen atoms, (ii) carbon, hydrogen, and oxygen atoms, and (iii) carbon, hydrogen, and nitrogen atoms; (4) wherein G is of the group consisting of —O—, —NH—, and —NR″—, said G being bonded to R and the carbonyl moiety of a unit defined in A above; and R″ being a hydrocarbon radical; and (5) wherein F is acyl; with the provisos that (a) the R‴ variables in unit (II) above do not exceed three, and (b) the carbon atom adjacent to the oxy atom in the unit (II) above contains at least one hydrogen substituent thereon.

5. The plasticized composition of claim 4 wherein A represents at least one unit (I) of the formula (I)
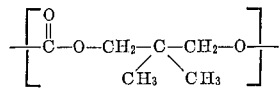

and at least one unit (I) of the formula (II)
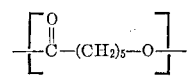

wherein G is an oxy group, and wherein said polycarbonate contains from about 50 to about 5 mol percent of unit I above, and from about 50 to about 95 mol percent of unit II above.

6. A plasticized composition consisting essentially of a vinyl chloride resin and vinylidene resins and, as the plasticizer therefor, a polycarbonate having an average molecular weight of from about 300 to about 9000 and characterized by the formula $R(GAF)_n$ (1) wherein A' represents at least one unit (I) of the formula (I)
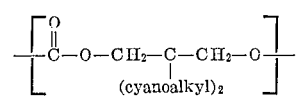

and at least one unit (II) of the formula (II)
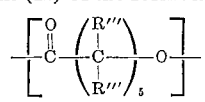

each R‴ being of the group consisting of hydrogen and lower alkyl; (2) wherein $n$ is at least one; (3) wherein R is an organic radical which is free from ethylenic and acetylenic unsaturation and which is composed of atoms of the group consisting of (i) carbon and hydrogen atoms, (ii) carbon, hydrogen, and oxygen atoms, and (iii) carbon, hydrogen, and nitrogen atoms; (4) wherein G is of the group consisting of —O—, —NH—, and —NR"—, said G being bonded to R and the carbonyl moiety of a unit defined in A above, and R" being a hydrocarbon radical; and (5) wherein F is acyl; with the provisos that (a) the R'" variables in unit II above do not exceed three, and (b) the carbon atom adjacent to the oxy atom in unit II above contains at least one hydrogen substituent thereon.

7. The plasticized composition of claim 6 wherein A represents at least one unit (I) of the formula (I)
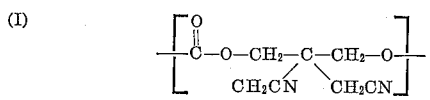

and at least one unit (II) of the formula (II)
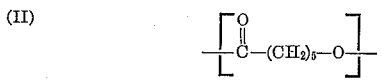

wherein G is an oxy group, and wherein said polycarbonate contains from about 50 to about 5 mol percent of unit I above, and from about 50 to about 95 mol percent of unit II above.

8. A plasticized composition consisting essentially of a vinyl chloride resin and vinylidene resins and, as the plasticizer therefor, a polycarbonate having an average molecular weight of from about 300 to about 9000 and characterized by the formula $$R(GAF)_n$$

(1) wherein A' represents at least one unit (I) of the formula (I)
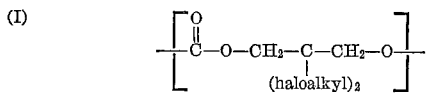

and at least one unit (II) of the formula (II)
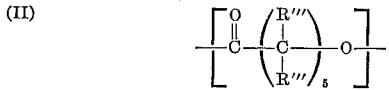

each R' being of the group consisting of hydrogen and lower alkyl; (2) wherein $n$ is at least one; (3) wherein R is an organic radical which is free from ethylenic and acetylenic unsaturation and which is composed of atoms of the group consisting of (i) carbon and hydrogen atoms, (ii) carbon, hydrogen, and oxygen atoms, and (iii) carbon, hydrogen, and nitrogen atoms; (4) wherein G is of the group consisting of —O—, —NH—, and —NR"—, said G being bonded to R and the carbonyl moiety of a unit defined in A above, and R" being a hydrocarbon radical; and (5) wherein F is acyl; with the provisos that (a) the R variables in unit II above do not exceed three, and (b) the carbon atom adjacent to the oxy atom in unit II above contains at least one hydrogen substituted thereon.

9. The plasticized composition of claim 8 wherein A represents at least one unit (I) of the formula (I)
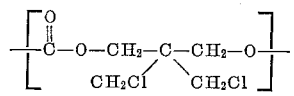

and at least one unit (II) of the formula (II)
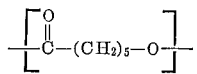

wherein G is an oxy group, and wherein said polycarbonate contains from about 50 to about 5 mol percent of unit II above, and from about 50 to about 95 mol percent of unit II above.

10. A vinyl resin plasticized composition comprising a vinyl resin and, as the plasticizer therefor, a polycarbonate which is characterized by at least one carbonyloxyalkyleneoxy unit therein, said unit having a terminal carbonyl group at one end, an oxy group at the other end, and an intermediate oxyalkylene chain of one oxygen atom and three carbon atoms, said oxygen atom being bonded to the terminal carbonyl group of said carbonyloxyalkyleneoxy unit; said polycarbonate being formed via the reaction comprising (1) contacting an admixture containing a substituted 2,6-dioxacylohexanone, with an initiator of the group consisting of glycols, diamines, and amino alcohols, said admixture being in molar excess with relation to said initiator, at a temperature of at least about 50° C., for a period of time to produce a hydroxyl terminated polycarbonate product; (2) thereafter contacting said polycarbonate product with a molar deficiency of a dicarboxylic acid, at an elevated temperature, to thus produce a chain extended hydroxyl terminated polycarbonate product; and (3) subsequently acylating the terminal hydroxyl groups thereof with a compound of the group consisting of anhydrides and organic acids which contain a sole carboxyl group.

11. A vinyl resin plasticized composition comprising a vinyl resin and, as the plasticizer therefor, a polycarbonate which is characterized by at least one carbonyloxyalkyleneoxy unit therein, said unit having a terminal carbonyl group at one end, an oxy group at the other end, and an intermediate oxyalkylene chain of one oxygen atom and three carbon atoms, said oxygen atom being bonded to the terminal carbonyl group of said carbonyloxyalkyleneoxy unit; said polycarbonate being formed via the reaction comprising (1) contacting an admixture containing a substituted 2,6-dioxyacyclohexanone, with an initiator of the group consisting of glycols, diamines, and amino alcohols, said admixture being in molar excess with relation to said initiator, at a temperature of at least about 50° C., for a period of time to produce a hydroxyl terminated polycarbonate product; (2) thereafter contacting said polycarbonate product with a molar excess of a dicarboxylic acid, at an elevated temperature, to thus produce a carboxyl terminated polycarbonate product; and (3) subsequently esterifying the terminal carboxyl groups thereof with a monohydric alcohol.

References Cited
UNITED STATES PATENTS 2,914,556 11/1959 Hostettler et al.
3,021,317 2/1962 Cox et al. _____ 260—78.3
3,169,945 2/1965 Hostettler et al. _____ 260—32.2

MORRIS LIEBMAN, *Primary Examiner.*

L. T. JACOBS, *Assistant Examiner.*